US007526605B2

(12) United States Patent
Espeseth et al.

(10) Patent No.: US 7,526,605 B2
(45) Date of Patent: Apr. 28, 2009

(54) SYSTEM AND METHOD FOR OPTIMIZING RANDOM XOR COMMAND PERFORMANCE

(75) Inventors: Adam Michael Espeseth, Rochester, MN (US); Edward Henry Younk, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 364 days.

(21) Appl. No.: 11/118,157

(22) Filed: Apr. 29, 2005

(65) Prior Publication Data
US 2006/0248270 A1 Nov. 2, 2006

(51) Int. Cl.
*G06F 13/14* (2006.01)
(52) U.S. Cl. .................. 711/112; 711/100; 711/114; 711/154; 710/1; 710/5; 710/6; 710/39
(58) Field of Classification Search .......... 711/100, 711/112, 114, 154, 169; 710/1, 5, 6, 36, 710/39
See application file for complete search history.

(56) References Cited

U.S. PATENT DOCUMENTS

| 5,193,036 | A | 3/1993 | Green et al. ........... 360/78.14 |
|---|---|---|---|
| 6,493,171 | B2 | 12/2002 | Enokida et al. ............ 360/75 |
| 6,725,327 | B1 | 4/2004 | Espeseth et al. ........... 711/112 |
| 6,728,054 | B2 * | 4/2004 | Chng et al. ............... 360/63 |
| 6,845,405 | B1 * | 1/2005 | Thelin .................... 710/6 |
| 6,859,859 | B2 * | 2/2005 | Hall ..................... 711/112 |
| 6,918,007 | B2 * | 7/2005 | Chang et al. ............. 711/114 |
| 7,194,589 | B2 * | 3/2007 | Lahiri et al. ............. 711/156 |

OTHER PUBLICATIONS

Popovici, et al., "Robust, Portable I/O Scheduling with the Disk Mimic", Proceeding of the UNSNIX 2003 Annual Technical Conference, Jun. 9-14, 2003, pp. 1-14.
Kotz, et al., "A Detailed Simulation Model of the HP 97560 Disk Drive", Department of Computer Science Dartmouth College, Darmouth PCS-TR94-220, Jul. 18, 1994, pp. 1-13.
Rob Elliott, "Bidirectional XDWRITEREAD commands for SBC-2", email to T10 Technical Committee, Sep. 28, 2000, pp. 1-5.

* cited by examiner

*Primary Examiner*—Jasmine Song
(74) *Attorney, Agent, or Firm*—John L. Rogitz

(57) ABSTRACT

Multiple disk access commands such as XOR commands are broken down into their constituent read and write parts and, if in LBA sequence, coalesced into pipes. These XOR read and write commands are then provided to the RPO algorithm of the HDD for scheduling along with data reads and writes. The actual XOR buffer operation is also scheduled by the RPO algorithm, advantageously to occur during a seek for another read or write.

17 Claims, 2 Drawing Sheets

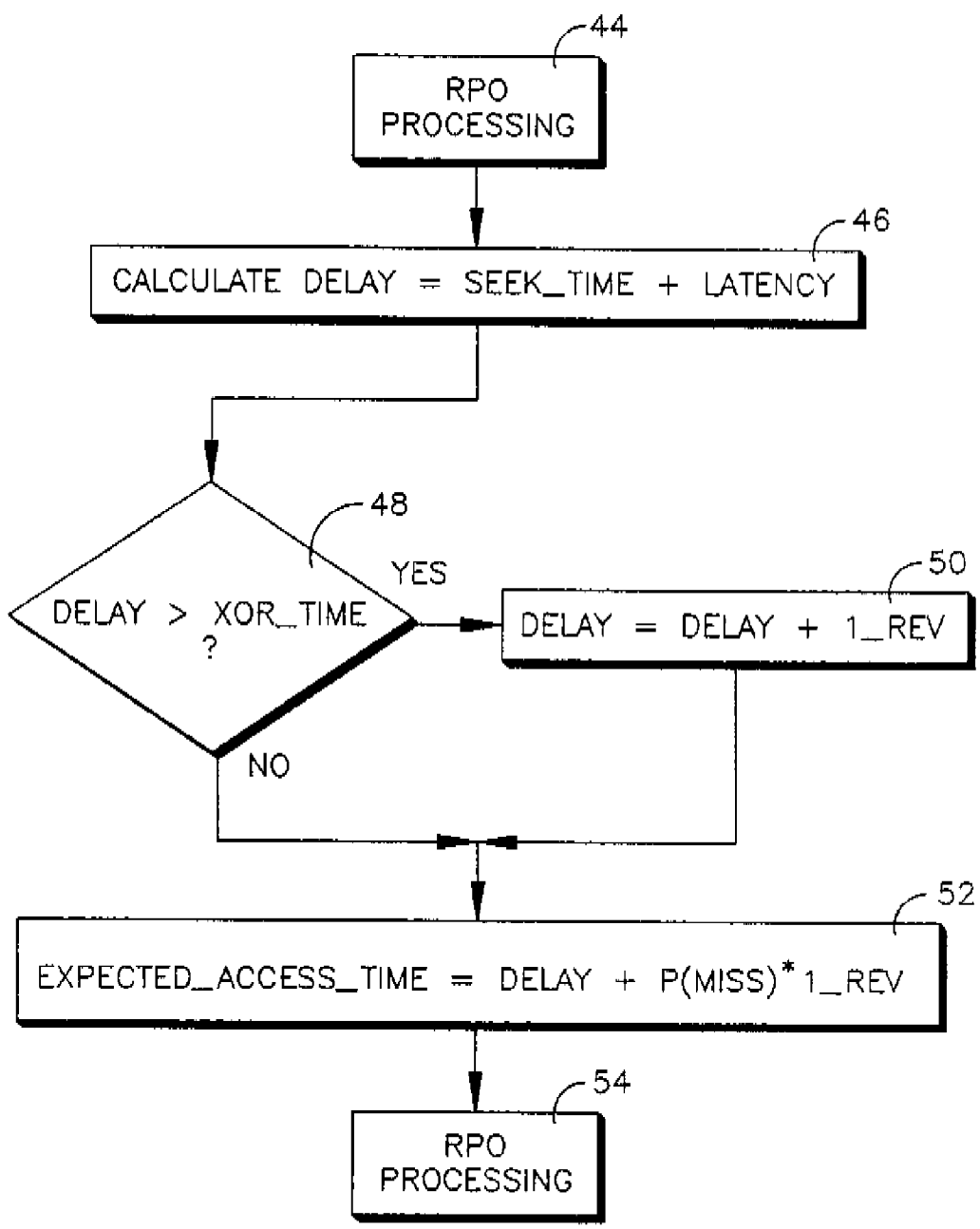

SYSTEM AND METHOD FOR OPTIMIZING RANDOM XOR COMMAND PERFORMANCE

FIELD OF THE INVENTION

The present invention relates to hard disk drives.

BACKGROUND OF THE INVENTION

When a hard disk drive (HDD) has more than one command to execute, the commands are placed in a queue from which the next command is chosen. A Rotational Position Optimization (RPO) algorithm is used to reorder the commands for execution. Presently, hard disk drives use a Shortest Access Time First (SATF) RPO algorithm to determine which command to select. This algorithm works as follows: given a set of commands in a queue, choose the command that can be started (accessed) first. This calculation has two parts, namely, the time to perform the seek and settle operation from the current cylinder to the target cylinder, and the latency (also referred to as "extra time" herein) between this point and the starting sector for the command. Together these parts make up the estimated access time (EAT) for each queued command. The SATF algorithm depends on accurate estimates of the access time. If the estimate is too low, the actuator may settle on track after the desired sector has passed rotationally resulting in a 'miss' which adds one full revolution to the access time and, thus, degrading performance. On the other hand, if the estimate is too high, the optimal command candidate is not chosen for execution.

In any case, a SATF RPO algorithm simply selects the command which can be started first. A Delta Expected Access Time (DEAT) RPO algorithm has been proposed as an improved SATF by choosing the command that has the shortest access time as well as an acceptable probability of success. The DEAT algorithm is disclosed in U.S. Pat. No. 6,725,327 incorporated herein by reference.

Apart from RPO considerations, some HDD applications such as, e.g., Redundant Arrays of Independent Disks (RAID) applications use commands each of which involves multiple disk operations. For instance, to generate parity data that can be used in error recovery, XOR commands are used which involve one or more reads, an XOR operation, and one or more writes of the result. In current hard disk drive firmware, XOR commands are typically treated as non-read/write commands and do not take advantage of RPO to reduce disk latencies. That is, the RPO algorithms do not optimize XOR commands in the same advantageous way they optimize data read and data write commands. It may now be understood that as used herein, a "data read" and a "data write" respectively refer to the non-XOR reads and writes conventionally scheduled by RPO algorithms, and not to reads and writes that are only made necessary pursuant to executing XOR commands.

Further, as recognized herein XOR commands typically are not sequentially attached to one another. That is, multiple XOR media-access commands are not coalesced to reduce the number of separate disk accesses if they represent LBA ranges that are sequential. As further understood herein, however, most XOR commands involve 'read-modify-write' type accesses to the command's LBA range which, as critically recognized herein, can be better optimized.

Currently, various types of XOR commands are used, all of which can be improved by present principles. As one example, a so-called "XPWrite" command can be used in which the data transferred from the host is XORed with the existing data on the media, and the resulting data is then written to the media. Of importance to the present invention is the latency (herein referred to as "mid-latency") that exists between the read and write operations of the XOR command. As another example, an "XDWriteRead" operation can be used wherein the data transferred from the host is written to the media, XORed with the old data on the media, and returned to the host. Regardless of the specific type of XOR command, the present invention is directed to reducing the overall rotational latencies involved in the read and write portions of the XOR command.

SUMMARY OF THE INVENTION

As set forth further below, the present invention essentially treats the read and write media accesses of an XOR command as separate commands, optimally attaching sequential accesses into a single pipe for one media access, and allowing the RPO algorithm to schedule these pipes to reduce latency. Some aspects of the invention also provide a way to allow RPO to schedule the execution of buffer XOR operations. The RPO algorithm can weigh the mid-latency of the XOR's write and the access time of the unrelated data write access, and select which access will be started first.

Accordingly, in a first aspect a hard disk drive (HDD) includes at least one rotatable disk and at least one data transfer element. A HDD controller controls the data transfer element to execute commands. The controller executes a Rotational Position Optimization (RPO) algorithm ordering commands in a queue. The queued commands include data reads and data writes. In accordance with present principles, the commands in the queue can also include a read and a write associated with a command requiring multiple disk accesses, such as, e.g., an XOR command.

In some implementations the read and write commands in the queue that are associated with a command requiring multiple disk accesses can be LBA-sequential, and if they are they may be advantageously coalesced into pipes. A non-limiting preferred RPO algorithm that can be used is a Delta Expected Access Time (DEAT) algorithm.

As intended in some non-limiting embodiments, XOR buffer operations are also in the queue for scheduling. An XOR buffer operation may be scheduled by the RPO algorithm for execution during a seek for executing another command.

In another aspect, a chip assembly for a data storage device executes logic that includes receiving a command requiring multiple disk accesses, with at least one of the accesses being a read access and at least one of the accesses being a write access. The logic also includes separating the read access from the write access, providing the read access and the write access to at least one RPO algorithm, and using the RPO algorithm to schedule the read access and write access.

In still another aspect, a HDD includes at least one disk and a controller writing data to and reading data from the disk in response to commands in a queue. The controller determines a command to execute by invoking means for comparing a delay time with an XOR execution time. The controller may also invoke means for determining the delay as a sum of a seek time and a latency period, and means for redefining the delay as a sum of a revolution time, a seek time, and a latency period, in response to the means for comparing.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a flow chart of the novel RPO-related logic.

DETAILED DESCRIPTION OF THE PREFERRED EMBODIMENT

Figure 1:
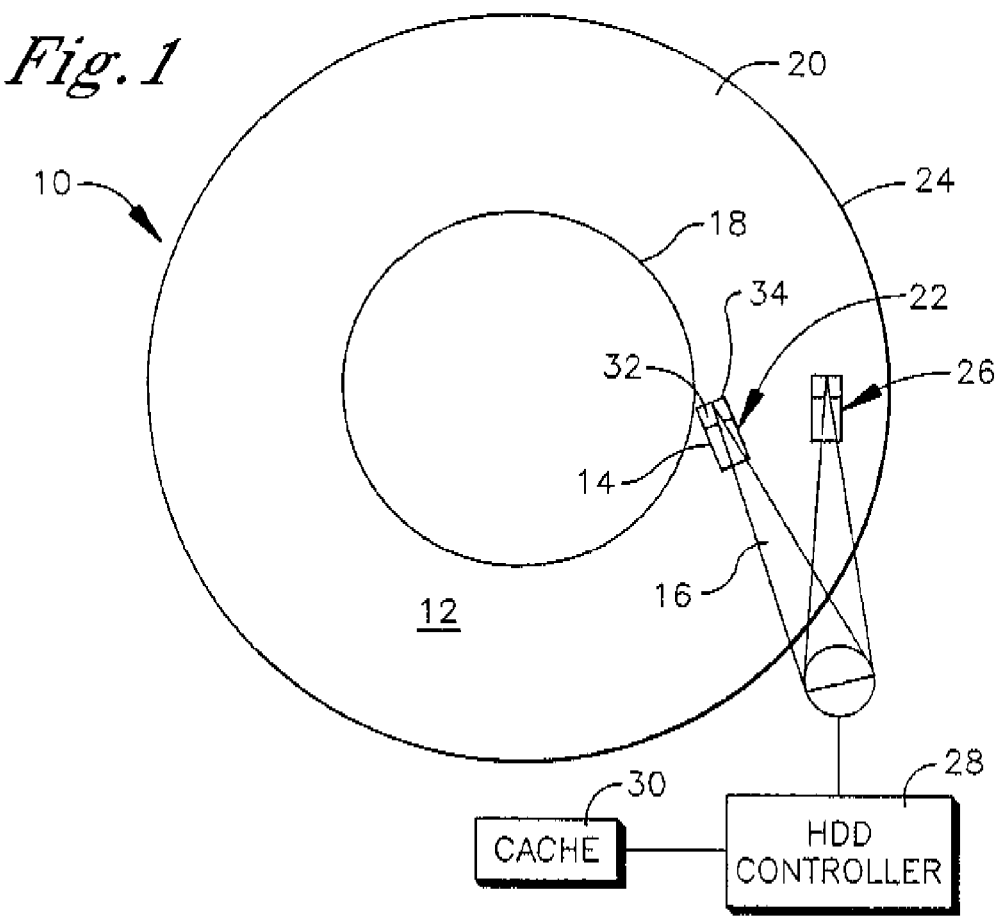
FIG. 1 is a schematic view of the hard disk drive, showing the actuator arm near the inner diameter (ID) and the outer diameter (OD) of the disk.

Referring initially to FIG. 1, a data storage system is shown, generally designated 10, which includes one or more (only one shown for clarity) rotatable hard disks 12 onto which data can be written and from which data can be read by a read/write head 14 that is mounted on an actuator arm 16 for movement of the head 14 over the disk 12 between an inner diameter (ID) 18 of a data storage area 20 of the disk 12 (indicated at position 22 of the head 14) and an outer diameter 24 of the storage area 20 (indicated at position 26 of the head 14). The head 14 and actuator 16 may be controlled by a processor such as a hard disk drive (HDD) controller 28, which executes the below-described logic in accordance with present principles. The controller 28 may be a chip that includes firmware embodying the logic below, which is executed by a processor that can also be on the controller chip or that can be on a separate chip, in which case the controller 28 can be thought of as including both chips. In any case, the controller 28 may also access a solid state data cache or buffer 30. Also, as figuratively shown in FIG. 1, the head 14 may include a write element 32 and a read element 34. The head 14 may be configured for longitudinal recording or for perpendicular recording.

The HDD may be implemented in a RAID system requiring the generation of parity using, e.g., XOR operations. Accordingly, as used herein, the term "buffer XOR" represents the actual operation of XORing data in the drive's internal buffer, e.g., the cache 30. The term "pipe" refers to a list of commands that pertain to blocks that have sequential logical block addresses (LBAs) to one another.

Figure 2:
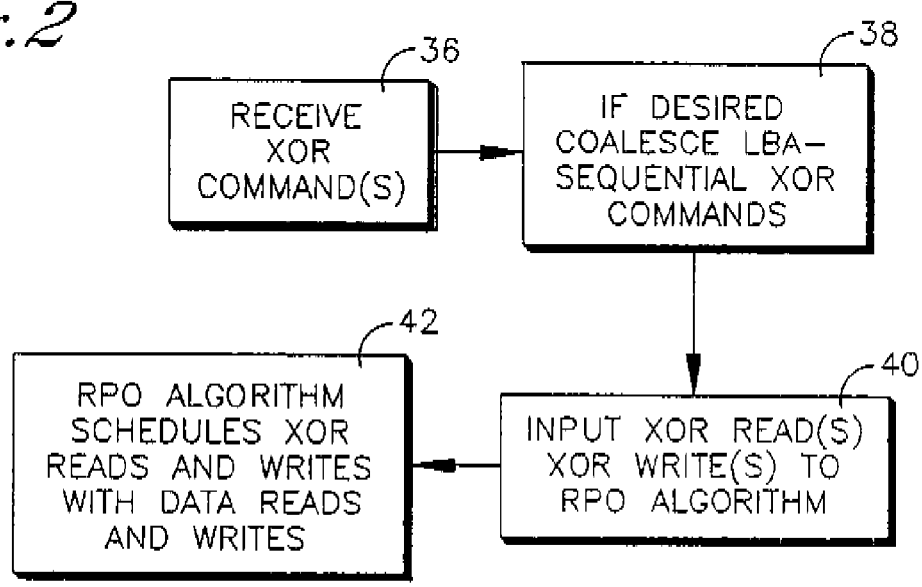
FIG. 2 is a flow chart of the overall logic.

With this in mind and now referring to FIG. 2, one or more commands, each of which requires multiple disk accesses such as bi-directional commands like XOR commands, are received at block 36. At block 38 the multiple access commands are broken down into their separate disk accesses. This step can be done by the RPO algorithm itself or prior to sending the commands to the RPO algorithm. In either case, if the read and/or write portions of commands are LBA-sequential, if desired for greater optimization they may be coalesced at block 38, i.e., they may be attached sequentially to each other if they represent LBA-sequential accesses. Both reads and writes may be included in a single LBA-sequential pipe, or a single pipe may consist only of LBA-sequential reads, or only of LBA-sequential writes.

Proceeding to block 40, the broken down commands, e.g., XOR reads (potentially coalesced in pipes) and XOR writes (likewise potentially coalesced in pipes) are input to the queue of the RPO algorithm. As more fully disclosed below in reference to FIG. 3, at block 42 the RPO algorithm schedules the XOR reads and writes with data reads and writes in the queue.

With more specificity, recall that an SATF RPO algorithm (e.g. DEAT) selects the command in the queue that can be started first. The RPO algorithm compares the start times of all read/write commands in the queue, while enforcing data integrity by preventing commands with overlapping LBA ranges from being executed out of order. In the present invention the RPO likewise ensures that the disk accesses of each XOR command are executed in the correct order, depending, e.g., on the type (XPwrite or XDreadwrite) of XOR scheme being used. The cost function (or start time estimation function) of the DEAT algorithm is shown below for reference.

$$\text{expected\_access\_time} = \text{seek\_time} + \text{latency} + P(\text{miss}) * (1 rev)$$

This cost function is used to schedule the read and write accesses of FIG. 3.

Additionally, the buffer XOR operation is also scheduled by the RPO by adding it to the RPO queue, because as recognized herein, depending on the hardware configuration the buffer XOR operation itself may consume resources that may prevent a concurrent read or write operation. As intended herein, however, the buffer XOR operation is executed during a seek for a different command. This may be implemented regardless of the particular RPO algorithm being used by defining the variable "expected_access_time" to be zero for a buffer XOR operation, which causes the buffer XOR to be started immediately after the completion of the read operation. Advantageously, the RPO algorithm can concurrently select a command for execution that has a seek_time+latency greater than the expected duration of the buffer XOR operation. This is beneficial because there is a high probability that data read/write commands are interspersed with XOR commands in the queue in a real workload. Thus, the seek for a data read/write command can be started as the buffer XOR operation executes.

The above read and write accesses, combined with buffer XOR operations, are independently scheduled by the RPO algorithm, with the following restrictions. These restrictions involve the required order of operations within a single command. For example, the required order of operations of XPWrite is read—buffer XOR—write. These restrictions are enforced in the same way that the RPO algorithm handles queued commands that contain overlapping LBA ranges. These media accesses and buffer XOR's can be processed by the RPO algorithm as if they were separate commands.

The above discussion can be better understood in detail by referring to FIG. 3. Block 44 indicates that during RPO processing of commands in its queue, which, per FIG. 2, includes both data commands and as intended herein read and write commands related to XORs (or other multiple disk access commands) as well as buffer XOR operations, a "delay" is calculated at block 46 from the sum of the seek time for the command being processed plus related latency.

At decision diamond 48 it is determined whether the delay calculated at block 46 is greater than an XOR_Time of a buffer XOR operation in the queue, i.e., the time it would take to complete the next buffer XOR operation in the queue. If so, the delay is defined at block 50 to be the delay at block 46 plus the time it takes for the disk to complete a revolution. In this way, the buffer XOR operation can be completed during a seek for the next read or write, whether a data or XOR read or write.

From block 50 or from decision diamond 48 if the test there was negative, the logic flows to blocks 52 and 54, which are conventional RPO processing steps. More specifically, at block 52 an expected access time is calculated in accordance with, e.g., DEAT principles known in art, although as stated above the present invention is not limited to DEAT. When DEAT is used, states 46, 48, and 50 can replace the prior DEAT "delay" calculation (i.e., Delay=seek_time+latency calculation). Further RPO processing is undertaken at block 54.

Thus, FIG. 3 illustrates that when a buffer XOR operation is selected by the RPO algorithm, the RPO algorithm is configured such that the next read/write operation cannot be started before the buffer XOR operation is complete. This is necessary because the RPO algorithm in the present invention cannot assume that all of the drive's resources can be dedicated to a command started during a buffer XOR operation, although if the drive supports concurrent disk and buffer XOR operations, RPO dependencies related to the XOR operation can be satisfied as long as the buffer XOR has already been "started" (assuming that the buffer XOR runs faster than the data can be written).

While the particular SYSTEM AND METHOD FOR OPTIMIZING RANDOM XOR COMMAND PERFORMANCE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A hard disk drive (HDD) comprising:
at least one rotatable disk;
at least one data transfer element; and
at least one controller controlling the data transfer element to execute commands, the controller executing a Rotational Position Optimization (RPO) algorithm ordering commands in a queue, the commands including data reads and data writes, the commands in the queue also, including at least one read and at least one write associated with a command requiring multiple disk accesses;
wherein the HDD is implemented in a RAID and the command requiring multiple disk accesses is an XOR command.

2. The HDD of claim 1, wherein at least some of the read and write commands in the queue that are associated with a command requiring multiple disk accesses are LBA-sequential, and are coalesced into pipes.

3. The HDD of claim 1, wherein the RPO algorithm is a Delta Expected Access Time (DEAT) algorithm.

4. The HDD of claim 1, wherein XOR buffer operations are also in the queue for scheduling.

5. The HDD of claim 4, wherein an XOR buffer operation is scheduled by the RPO algorithm for execution during a seek for executing another command.

6. A chip assembly for a data storage device and executing logic assembly performing a method comprising:
receiving a command requiring multiple disk accesses, at least one of the accesses being a read access and at least one of the accesses being a write access;
separating the read access from the write access;
providing the read access and the write access to at least one RPO algorithm; and
using the RPO algorithm to schedule the read access and write access;
wherein the RPO algorithm also schedules data reads and data writes and wherein a controller is implemented in a RAID and the command requiring multiple disk accesses is an XOR command.

7. The chip assembly of claim 6, wherein at least some of the read and write accesses associated with a command requiring multiple disk accesses are LBA-sequential, and are coalesced into pipes.

8. The chip assembly of claim 6, wherein the RPO algorithm is a Delta Expected Access Time (DEAT) algorithm.

9. The chip assembly of claim 6, wherein XOR buffer operations are also scheduled by the RPO algorithm.

10. The chip assembly of claim 9, wherein an XOR buffer operation is scheduled by the RPO algorithm for execution during a seek for executing another command.

11. A HDD comprising:
at least one disk;
a controller writing data to and reading data from the disk in response to commands in a queue, the controller determining a command to execute at least in part by invoking:
means for comparing a delay time with an XOR execution time.

12. The HDD of claim 11, wherein the controller invokes:
means for determining the delay time as a sum of a seek time and a latency period;
means for redefining the delay time as a sum of a revolution time, a seek time, and a latency period, in response to the means for comparing.

13. The HDD of claim 12, wherein the means for comparing and means for redefining are embodied in an RPO algorithm.

14. The HDD of claim 13, wherein the RPO algorithm schedules data reads, data writes, XOR reads, XOR writes, and XOR buffer operations.

15. The HDD of claim 14, wherein at least some of the XOR read commands and/or XOR write commands are LBA-sequential, and are coalesced into pipes.

16. The HDD of claim 13, wherein the RPO algorithm is a Delta Expected Access Time (DEAT) algorithm.

17. The HDD of claim 14, wherein an XOR buffer operation is scheduled by the RPO algorithm for execution during a seek for executing another command.

* * * * *